Figure 8:
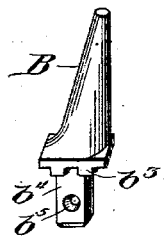

No. 753,456. PATENTED MAR. 1, 1904.
W. G. G. WEIDINGER.
PLIERS JAWS.
APPLICATION FILED SEPT. 11, 1903.
NO MODEL. 2 SHEETS—SHEET 1.
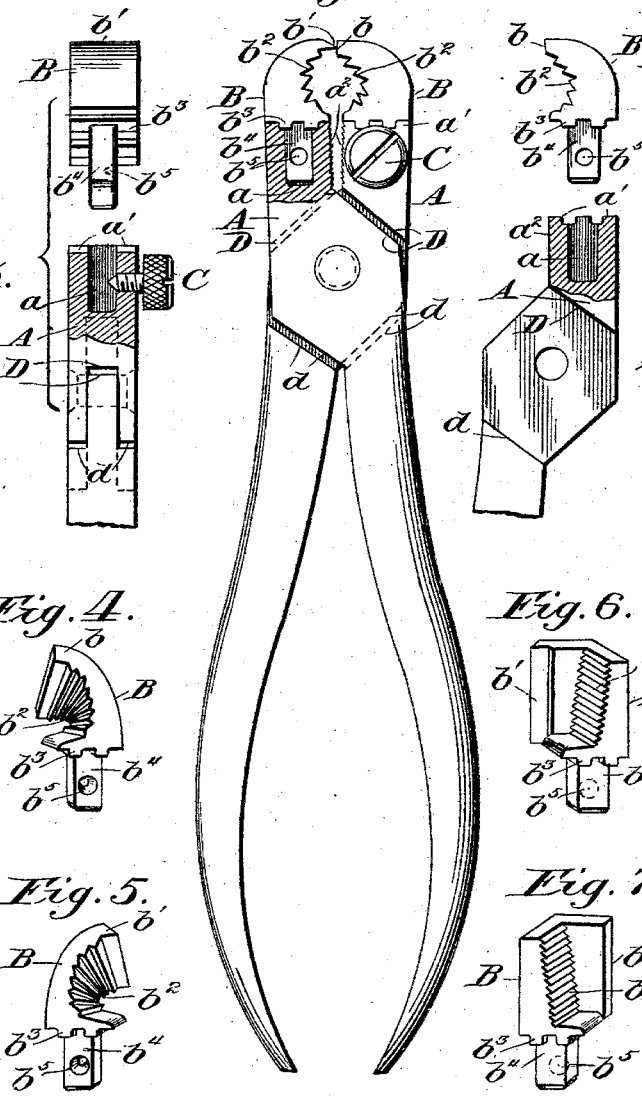

No. 753,456. PATENTED MAR. 1, 1904.
W. G. G. WEIDINGER.
PLIERS JAWS.
APPLICATION FILED SEPT. 11, 1903.
NO MODEL. 2 SHEETS—SHEET 2.

Witnesses:
John H. G. Weidinger
Edyth A. Weidinger

Inventor:
William G. G. Weidinger

No. 753,456. Patented March 1, 1904.

UNITED STATES PATENT OFFICE.

WILLIAM G. G. WEIDINGER, OF CHICAGO, ILLINOIS.

PLIERS-JAWS.

SPECIFICATION forming part of Letters Patent No. 753,456, dated March 1, 1904.

Application filed September 11, 1903. Serial No. 172,842. (No model.)

*To all whom it may concern:*

Be it known that I, WILLIAM G. G. WEIDINGER, a citizen of the United States, residing at Chicago, in the county of Cook and State of Illinois, have invented certain new and useful Improvements in Pliers-Jaws; and I do hereby declare the following to be a full, clear, and exact description of my invention, such as will enable others skilled in the art to which it appertains to make and use the same.

My invention has relation to pliers, and relates in particular to pliers having toothed jaws, and has for its object the provision of novel means whereby the jaw of the pliers may be made removable and replaceable by jaws of different constructions, thereby rendering the pliers adaptable to a larger variety of work than heretofore and also rendering it possible to remove and replace the jaws when worn.

My invention consists in the novel construction of the plier-handles and partial jaws hereinafter described and in the combination therewith of novel forms of removable jaws.

My invention further consists in the novel constructions, combinations, and arrangements of parts hereinafter described and claimed.

Referring to the accompanying drawings, wherein Figure 1 is an elevation of my improved pliers with one form of removable jaws, a portion of one of the partial jaws being in section. Fig. 2 is a detail elevation of part of one handle, partly in section, showing one partial jaw and one removable jaw detached therefrom. Fig. 3 is an edge view of the parts shown in Fig. 2, part of the handle being in section. Figs. 4 5, 6 7, 8 9, 10 11, 12 13, 14 15, and 16 17 are perspective views of jaws of modified form, each figure representing one jaw and the next succeeding figure the other jaw of a pair.

The handles of the pliers consist, as usual, of two properly and symmetrically shaped curved sections crossing one another and pivotally secured together at their point of juncture.

Ordinarily the jaws of pliers are formed integral with the handles; but in my improvement a part only of the jaws are formed integral with the handle, the balance of each jaw being composed of a separate detachable section, provided, as will be hereinafter described, with various forms of gripping-surfaces.

Each partial jaw A of my pliers is formed with a socket $a$, into which enters, from the side of the jaw, a set-screw C, having a pointed end.

B B designate the removable or supplemental jaws, which have shanks $b^4$, fitting the sockets $a$ and formed with recesses $b^5$, into which the pointed ends of set-screws C enter.

The jaws B are formed with lateral ribs $b^3$, fitting lateral grooves $a'$ in the jaws A. The removable jaws B B (shown in Fig. 1) are concave on their adjacent surfaces and formed with teeth $b^2$, as shown, this being the usual form of the jaws of gas-pliers of the ordinary construction, or they may have tapered concavities, as shown in a pair of jaws illustrated in Figs. 4 and 5, or flat tapered surfaces, as illustrated in Figs. 6 and 7, or gripping-surfaces of other form, as shown in the succeeding figures.

In addition to the teeth $b^2$ one of the jaws B in Figs. 1, 2, 3, 4, and 5 is formed with a transverse cutting edge $b'$ and the other with a flat abutting surface $b$, while the pair of jaws shown in Figs. 6 and 7 are formed one with a longitudinally-disposed cutting edge $b'$, the other with a similarly-disposed abutting surface $b$, with which the cutting edge $b'$ contacts.

The inner surfaces of the jaws A may be formed with lateral teeth $a^2$, which will enable the pliers to be used for grasping smaller articles than can be conveniently gripped between the forms of the movable jaws shown in some of the figures.

Figure 9:
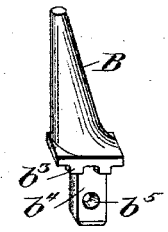
Figure 10:
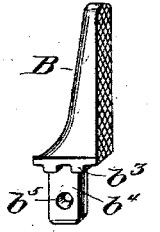
Figure 11:
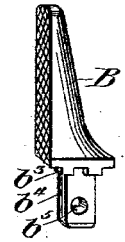
Figure 12:
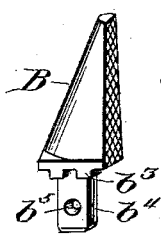
Figure 13:
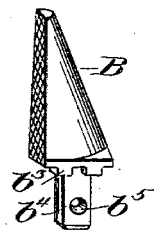
Figure 14:
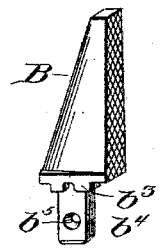
Figure 15:
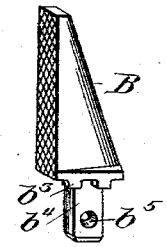
Figure 16:
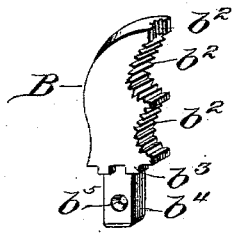
Figure 17:
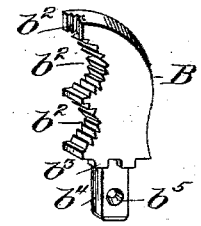

The modified forms of jaw shown in Figs. 8 to 17 are adapted for various uses, those shown in Figs. 8 and 9 being round, 10 and 11 flat, 12 and 13 chain, 14 and 15 flat, 16 and 17 double gas-tongs, and all being constructed according to my invention and adapted to be used, as occasion may require, with the handles and partial jaws shown in Fig. 1.

The device described forms a cheap, simple, strong, and effective pliers adapted by changing the removable jaws to perform a variety of work.

When any of the sets of removable jaws become worn or broken, they may be readily removed for repair or replacement, the wear on the handles and the permanent portions of the jaws being usually insignificant.

Having thus described my invention, what I claim, and desire to secure by Letters Patent, is—

1. In pliers, the combination with pivoted handles and permanent partial jaws formed integral therewith and having abutting operative surfaces, of removable toothed supplemental jaws arranged on the ends of the permanent jaws and having shanks fitting sockets in said permanent jaws and means for securing the removable jaws in position, substantially as described.

2. In pliers, the combination of handles having integral partial jaws with abutting operative surfaces and formed with longitudinal sockets and set-screws entering the sockets, and movable jaws arranged on the ends of the permanent jaws and having shanks fitting in said sockets and engaged by said screws and having opposing operative surfaces beyond the operative surfaces of the permanent jaws, substantially as described.

3. In pliers, the combination of pivoted handles and integral partial jaws having opposing operative surfaces of equal length to the jaws, with removable jaws attached to the ends of said partial jaws and formed with lateral teeth and abutting cutting-surfaces, substantially as described.

4. In pliers, the combination with the handles, and the partial jaws formed integral with the handles and having teeth on their inner surfaces, of the supplemental jaw secured to and upon the ends of said partial jaws and also formed with teeth on their inner surfaces, substantially as described.

WILLIAM G. G. WEIDINGER.

Witnesses:
 JOHN H. G. WEIDINGER,
 EDYTH A. WEIDINGER.